United States Patent [19]

Bagby

[11] Patent Number: 4,619,502

[45] Date of Patent: Oct. 28, 1986

[54] MIRROR FOCUSSING SYSTEM WITH NARROW VIEWING ANGLE

[75] Inventor: John P. Bagby, Anaheim Hills, Calif.

[73] Assignee: Hughes Aircraft Company, Los Angeles, Calif.

[21] Appl. No.: 636,892

[22] Filed: Aug. 2, 1984

[51] Int. Cl.$^4$ ............................................. G02B 17/06
[52] U.S. Cl. ..................................... 350/505; 350/443
[58] Field of Search ................. 350/505, 620, 442–444

[56] References Cited

U.S. PATENT DOCUMENTS

| | | | |
|---|---|---|---|
| 2,413,286 | 12/1946 | Buchele | 350/505 |
| 2,504,383 | 4/1950 | Bouwers et al. | 350/505 |
| 3,443,853 | 5/1969 | Todd, Jr. | 350/442 |
| 3,527,526 | 9/1970 | Silvertooth | 350/620 |
| 4,106,856 | 8/1978 | Babish | 350/442 |

OTHER PUBLICATIONS

Cox, R. E., "Eliminating Stray Light in Cass A Grain Telescopes", Sky & Telescope, 4-1963, pp. 232–235.

Primary Examiner—William H. Punter
Attorney, Agent, or Firm—Lewis B. Sternfels; A. W. Karambelas

[57] ABSTRACT

A telescope employs folded optics with multiple reflections between a concave primary reflector, oriented towards incoming radiation, and a convex secondary reflector to produce reflected imaging rays which are nearly parallel to the optic axis of the telescope. Such geometry permits extremely long focal length (high f numbers) systems in a very overall short length, and the insertion of tubular barriers, both of which serve to intercept rays of radiation from a strong source which is sufficiently close, in an annular sense, to the object being viewed to produce a glare which would mask the image. The structure of the telescope includes apertures in both the primary and secondary reflectors situated along the optical axis to permit the reflected rays to pass beyond the secondary reflector to a point in front of the focus of the primary reflector as well as to a point behind the primary reflector, but which block out off-axis rays outside the field of interest. The tubular barriers are positioned at the locations of the apertures so as to further block unwanted rays of radiation. The concave mirror positioned ahead of the focus of the primary reflector directs reflected rays back through the aperture of the secondary reflector towards the aperture in the primary reflector for detection by a sensor of the radiation.

6 Claims, 4 Drawing Figures

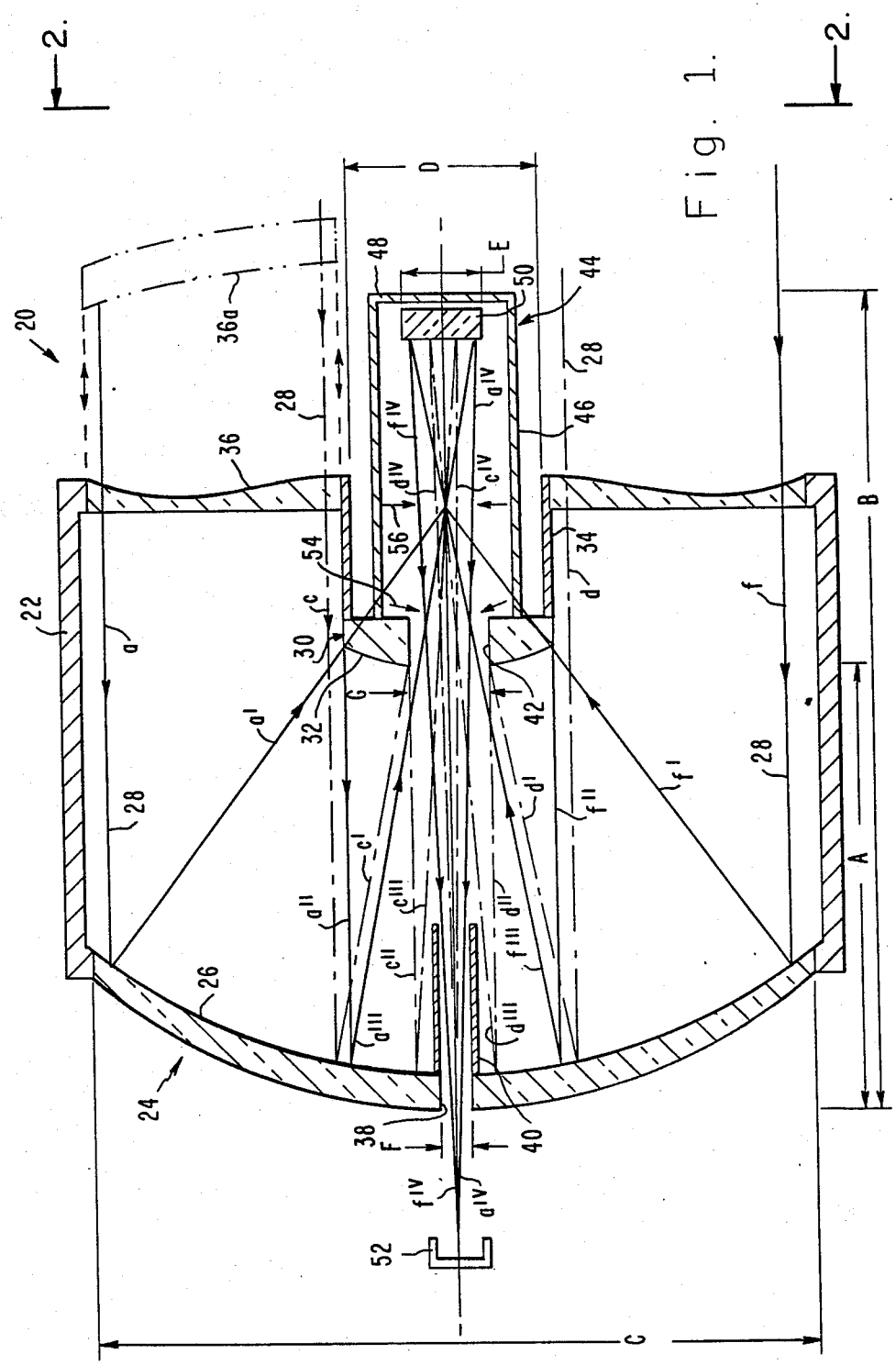

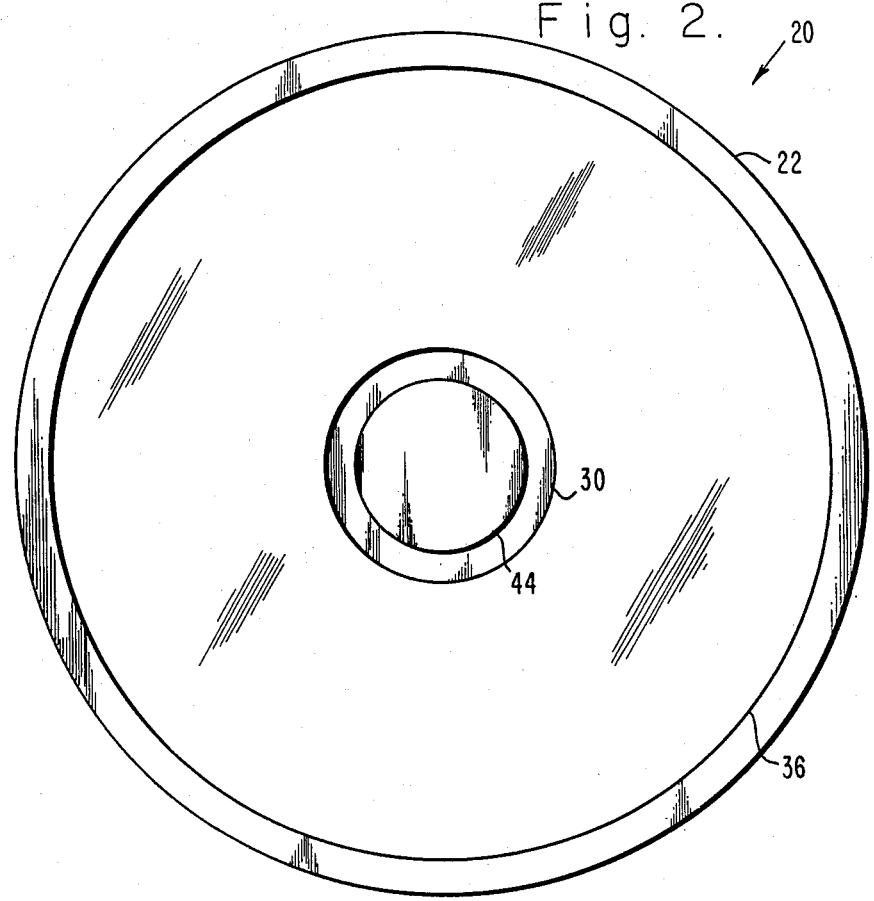
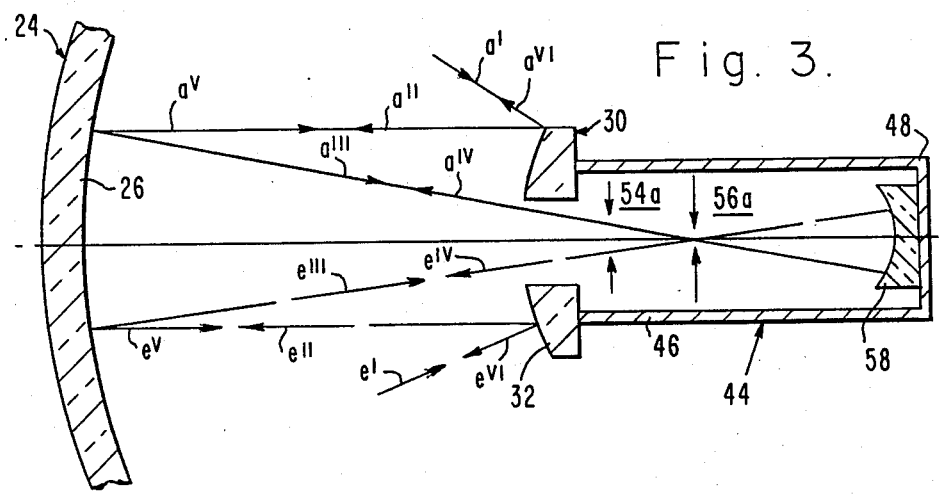

MIRROR FOCUSSING SYSTEM WITH NARROW VIEWING ANGLE

BACKGROUND OF THE INVENTION

This invention relates to optical imaging systems employing a series of reflecting elements and, more particularly, to a system having multiple reflections from any one of a set of mirrors for exclusion of light from sources outside the viewing angle of the system, and for rendering the system more compactly.

Optical imaging systems are employed over various portions of the spectrum including both the visual and infra-red portions of the spectrum. Of particular interest is the imaging of objects at long distances by telescope. Optical elements including both lenses and mirrors may be employed in telescopes, the mirrors being advantageous in regions of the spectrum in which totally transparent lens material may not be available, or where material transparent for all wavelengths of interest is not available. The mirrors are also preferred for their optional choice of thickness which can result in greater rigidity and the maintenance of dimensional stability in the case of very large elements, and allow for situations wherein a large amount of curvature is required in an optical surface.

A problem attendant through the use of telescopes is manifested in the viewing of an object which is a relatively weak source of light. This is especially so in the situations wherein the weak object is located nearby, in terms of angular spacing, to a relatively strong source of light. Light from the strong source may enter the optical system and mask the image of the weak source. A narrow viewing angle lessens the amount of light received from the strong source.

A narrow viewing angle can be obtained in a telescope constructed with mirrors by reflecting the rays of light back and forth between a pair of the mirrors, such as between a primary mirror and a secondary mirror which are curved to have focussing power. The multiple reflections permit reduction in the physical size of the telescope to provide the advantage of a more compact telescope. One such multiple-reflection optical system is shown in FIG. 1 of U.S. Pat. No. 3,527,526 issued in the name of Silvertooth. This patent is incorporated by reference in its entirety herein. However, these optical systems suffer a disadvantage in that still further isolation from the rays of the strong source is often desirable.

SUMMARY OF THE INVENTION

The foregoing problem is overcome and other advantages are provided by an optical system employing various amounts of multiple reflections between mirrored surfaces which are curved for power. In accordance with the invention, this arrangement provides a compact optical structure having a narrow viewing angle which reduces the amount of light received from a relatively strong source nearby, in terms of angle orientation from the optical axis, while utilizing fully a weaker emission of radiation from the object being viewed.

In one preferred embodiment of the invention, the optical system comprises a concave primary mirror facing a convex secondary mirror, both being symmetrically formed about a common optical axis.

In accordance with a feature of the invention, both the primary and the secondary mirrors may be provided with apertures through which converging bundles of rays propagate. Each aperture opens into a tubular barrier which blocks any light which may be propagated along paths outside the foregoing bundle of rays. In addition, the tubular barrier extending from the secondary aperture includes a curved tertiary mirror directing rays between the barriers to maximize the system's capability for rejection of light from sources outside the viewing angle. The curvature of the tertiary mirror can be selected to either provide for collimation or for focussing of the reflected rays. The tertiary mirror can be replaced with a spherical retrocollimator mirror to check system alignment.

BRIEF DESCRIPTION OF THE DRAWINGS

The foregoing aspects and other features of the invention are explained in the following description taken in connection with the accompanying drawing wherein:

FIG. 1 is an axial sectional view of a folded telescope employing primary and secondary curved mirrors for exclusion of extraneous light in accordance with the invention;

FIG. 2 is an end view of the telescope taken along the line 2—2 in FIG. 1;

FIG. 3 shows a portion of a sectional view of an optical system, such as that of FIG. 1, further employing a retrocollimator mirror advantageous in the alignment of the optical elements.

DETAILED DESCRIPTION

Figure 4:
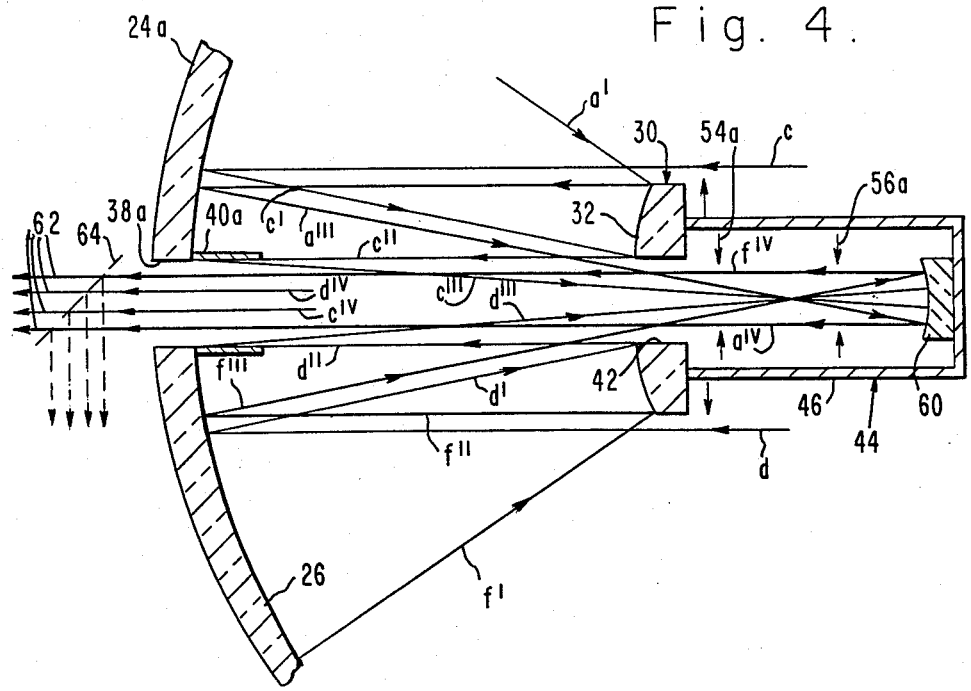
FIG. 4 shows a sectional view of a modified embodiment of the system of FIG. 1 wherein the output rays are brought out as a collimated bundle of rays.

With reference to FIGS. 1 and 2, there is disclosed a telescope 20 constructed with folded optics in accordance with the invention. The telescope 20 incorporates a housing 22 of cylindrical form, the housing 22 supporting a primary reflector 24 at the back side of the telescope 20, the front surface 26 of the reflector 24 being concave and being directed towards incoming rays 28 of radiation from a distant source (not shown). To simplify the description, only boundary rays are shown, these rays being identified by the letters a, c, d, and f with subsequent reflections of these rays 28 being indicated by prime signs affixed to the foregoing letters. The secondary reflector 30 has a convex surface 32 which faces the concave surface 26.

Both of the reflectors 24 and 30 can be fabricated from either vitreous or metallic substances. While the secondary reflector 30 may be supported by a spider, (not shown) within the housing 22, the preferred embodiment of the invention utilizes a support tube 34 connected at its back end to the secondary reflector 30, and connected at its front end by a lens 36 to the front rim of the housing 22. The lens 36 is transparent to the rays 28 for radiation and may be formed as a Schmidt corrector or, optionally, as a Maksutov-Bowers-Pfenning corrector lens 36a shown in phantom.

In accordance with a feature of the invention, the lens 36 or 36a is positioned by the housing 22 approximately in the plane of the focus of the primary reflector 24. By this positioning, any emanations of light from dirt, irregularities, or by way of reflections from a surface of the lens 36 are manifested as divergent bundles of rays which are so spread out within the housing 22 as to present no more than a negligible masking of an image point of a distant object (not shown) being viewed by the telescope 20.

To insure further isolation of the image rays from rays of extraneous light, the telescope 20 incorporates repetitive reflections of the light rays providing for successively increasing focal lengths of the successive bundles of rays. In addition, the telescope 20 incorporates structures which serve as baffles or barriers to the instrusion of any light rays which are not part of the cone of converging rays associated with the viewing of the object.

The foregoing additional isolation is provided, in accordance with the invention, by an aperture 38 disposed within the primary reflector 24 along its optical axis and opening into a tubular barrier 40 upstanding from the surface 26 and serving as a stop to rays of radiation disposed outside the desired bundle of converging rays.

The telescope 20 further comprises an aperture 42 disposed in the secondary reflector 30 along the optical axis thereof and opening into a chamber 44 upstanding from the back side of the secondary reflector 30 and extending forward of the telescope 20. The chamber 44 is formed of a tubular wall 46 which terminates in an end wall 48. The chamber 44 houses a tertiary mirror 50 having a curved surface facing the primary reflector 24 for directing rays back through both of the apertures 42 and 38 to focus at a detector 52 or other utilization device (not shown) located behind the primary reflector 24.

The curvature of the concave surface 26 and of the convex surface 32 and the spacing therebetween are selected to provide for multiple reflections of a ray 28 between the two surfaces before the ray 28 enters the aperture 42 to impinge upon the tertiary mirror 50. By virtue of the multiple reflections, the angle between a reflected portion of the ray 28 and the optical axis of the telescope 20 becomes successively narrower with each reflection and, correspondingly, the focal length of the optical system is increased with each reflection.

The paths of reflected extraneous rays of radiation (not shown) would be angled differently relative to the optical axis and, accordingly, the tubular barrier 40 serves as an effective stop for preventing such extraneous rays from entering the aperture 38 to impinge upon the detector 52. Similarly, the walls of the chamber 44 serve to exclude the extraneous light from the light of the object being viewed. Preferably, the interior surfaces of the walls 46 and 48 of the chamber 44 are coated with a light absorbing material so as to absorb any of the extraneous rays which may pass through the aperture 42 and impinge upon the walls of the chamber 44.

It is noted that the sides of the aperture 42 also serve as a stop, but can be augmented further by a stop 54 and, if desired, a further stop 56 may be positioned within the chamber 44 at the focal plane at the primary reflector 24. The stops 54 and 56 further reduce any interference or masking associated with extraneous sources of radiation.

With reference to construction details of the telescopes 20, FIG. 1 shows the various dimensions including diameters and spacing of the optical elements. Thus, A is the distance between the vertex of the surfaces 26 and 32, B is the spacing between the vertex of surface 26 of the primary reflector 24 and the vertex of reflecting surface of the tertiary mirror 50, and C, D, and E are, respectively, the diameters of the primary reflector, the secondary reflector 30 and the tertiary mirror 50. The diameters of the apertures 38 and 42 are represented by the letters F and G.

All of the optical elements have cylindrical symmetry. Accordingly, the active surfaces of these elements can be described by an equation in cylindrical coordinates wherein Z represents a distance from the central point of the active surface out along the optical axis to a transverse plane intersecting the optical surface. The second coordinate is Y representing a distance measured along the transverse plane from the optical axis to the arc of the intersection of the transverse plane with the optical surface.

Further embodiments of the optical system of FIG. 1 are disclosed in FIGS. 3 and 4. In FIG. 3, the tertiary mirror 50 of FIG. 1 has been replaced with a nominally spherical retrocollimator 58 which is useful in aligning the optical surfaces of the respective elements 24 and 30. The resulting rays reflected from the retrocollimator 58 pass back along the original paths of the rays 28 (see FIG. 1) to provide for a collimated beam exiting from the front face of the telescope 20. Examination of the collimation rays provides information as to the alignment of the reflecting surfaces.

In FIG. 4, the tertiary mirror 50 of FIG. 1 has been replaced with a mirror 60 that reflects the converging rays entering the chamber 44 into a bundle of parallel rays which exit the chamber 44 via the aperture 42.

In the embodiment of FIG. 4, the aperture in the primary reflector 24a is enlarged as shown at 38a to accommodate the widths of the collimated beams passing therethrough. To provide space for the bundle of collimated rays at the aperture 38a, the tubular barrier 40 of FIG. 1 is reduced in length and increased in diameter as shown at 40a so as to permit the boundary rays to be reflected from the concave surface 26 in the vicinity of the aperture 38a without impinging upon the tubular barrier 40a.

With the foregoing construction, there has been provided a telescope 20 with folded optics wherein multiple reflections are provided between concave and convex surfaces to bring the final portions of the rays of radiation to almost parallel orientation relative to the optical axis. The collimated rays may then be passed onward along the optical axis, as shown at 62, or deflected by a mirror 64 for utilization at another site.

With each embodiment of the invention, the optimal radius of curvature of an optical surface, the spacing between such surfaces, and the diameters of the stops are most readily accomplished with computer-aided design techniques, particularly ray tracing, which are currently in use for the design of optical systems. In addition, the digital description of optical surfaces, as provided by a digital computer, has the requisite format for the driving of automatic grinding machines currently in use in the manufacture of optical elements.

In addition to the multiple reflection between the concave and convex surfaces of the primary and the secondary reflectors, the construction of the invention also provides for a further extension of the reflecting paths, both ahead of the focus of the primary reflector via an aperture in the secondary reflector, as well as to a site behind the primary reflector via an aperture in the primary reflector. Tubular barriers are constructed at the sites of both of the apertures to further isolate the reflected rays of the object from the extraneous rays of stronger or other sources nearby the object, and thereby avoid the glare which would mask the image of the object. By such an arrangement, the long focal length system is made in compact form, while being resistant to glare from strong radiation sources adjacent a weakly radiating object.

The optical arrangements of FIGS. 3 and 4 permit the insertion of additional stops in the chamber 44. A stop is provided at 54a in the chamber 44 behind the secondary reflector 30 and the stop 56 of FIG. 1 is extended further towards the optical axis as shown at 56a of FIG. 3. Similar arrangements are shown in FIG. 4 wherein stop 54b and 56b appear in the chamber 44 alongside the outer boundaries of the beam of collimated rays produced by the mirror 60.

It should be understood that the above described embodiments of the invention are illustrative only and that modifications thereof may occur to those skilled in the art. Accordingly, this invention is not to be regarded as limited to the embodiments disclosed herein, but is to be limited only as defined by the appended claims.

I claim:

1. An optical system capable of guiding radiation from a distant source of the radiation to a sensor of the radiation, said system comprising:

a primary reflector having a concave surface facing the radiation from said source;

a secondary reflector having a convex surface facing the concave surface of said primary reflector;

said concave and said convex surfaces being matched to provide for multiple reflections therebetween of radiation incident on said primary reflector from a direction parallel to a central axis of said primary reflector;

apertures respectively in said reflectors;

tubular barriers communicating respectively with said apertures, a first of said barriers being oriented for enabling passage of multiply reflected rays of the radiation through said secondary reflector, and a second of said barriers being oriented for enabling passage of multiply reflected radiation to said sensor; and an arrangement of means, including said first and second reflectors, for enabling the radiation to be directed from one of said barriers to a second of said barriers to impede the reception at said sensor of radiation emanating from sites away from the pack of radiation from said source.

2. A system according to claim 1 wherein said primary reflector, said secondary reflector and said directing means are constructed of mirrors having cylindrical symmetry about a central axis, said central axis being the optical axis of said system, and wherein said tubular barrier communicating with said aperture in said secondary reflector is terminated in an end wall to form a chamber, said directing means being housed within said chamber.

3. A system according to claim 2 further comprising support means for positioning said secondary reflector relative to said primary reflector, said support means including a transparent member disposed within a path of said radiation, said transparent member being located approximately at a transverse plane which intersects the optical axis at the focus of said primary reflector.

4. A system according to claim 3 wherein said chamber is adapted for replacement of said directing means with a retrocollimator for alignment of said secondary reflector relative to said primary reflector.

5. A system according to claim 3 wherein said chamber is adapted for replacing of said directing means with a collimating mirror for directing a beam of collimated rays towards said primary reflector.

6. A system according to claim 3 wherein said chamber includes a stop extending inwardly from the tubular barrier of said chamber at a location adjacent the focus of the primary reflector.

* * * * *